(12) United States Patent
Chrabieh et al.

(10) Patent No.: US 8,352,843 B2
(45) Date of Patent: Jan. 8, 2013

(54) METHOD AND APPARATUS FOR CODING A COMMUNICATION SIGNAL

(75) Inventors: Rabih Chrabieh, San Diego, CA (US); Koorosh Akhavan, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1388 days.

(21) Appl. No.: 11/962,762

(22) Filed: Dec. 21, 2007

(65) Prior Publication Data

US 2008/0225982 A1 Sep. 18, 2008

Related U.S. Application Data

(60) Provisional application No. 60/895,427, filed on Mar. 16, 2007.

(51) Int. Cl.
*H03M 13/23* (2006.01)
*H03M 13/53* (2006.01)

(52) U.S. Cl. .................. 714/790; 714/701
(58) Field of Classification Search .............. None
See application file for complete search history.

(56) References Cited

U.S. PATENT DOCUMENTS

| | | | |
|---|---|---|---|
| 6,353,626 B1 * | 3/2002 | Sunay et al. | 375/130 |
| 6,735,185 B1 * | 5/2004 | Noneman | 370/335 |
| 6,993,062 B1 * | 1/2006 | Kong et al. | 375/130 |
| 7,127,661 B2 | 10/2006 | Yoon et al. | |
| 7,136,370 B2 | 11/2006 | Song et al. | |
| 7,529,307 B2 * | 5/2009 | Sandhu et al. | 375/260 |
| 2002/0031168 A1 * | 3/2002 | Kim et al. | 375/130 |
| 2002/0039355 A1 * | 4/2002 | Yun et al. | 370/318 |
| 2003/0014715 A1 * | 1/2003 | Lobinger et al. | 714/791 |
| 2004/0114691 A1 * | 6/2004 | Kim | 375/260 |
| 2007/0041458 A1 * | 2/2007 | Hocevar et al. | 375/260 |
| 2007/0110108 A1 * | 5/2007 | Kang et al. | 370/515 |
| 2008/0010582 A1 * | 1/2008 | Nieto et al. | 714/790 |
| 2008/0170162 A1 * | 7/2008 | Kim et al. | 348/725 |

FOREIGN PATENT DOCUMENTS

| | | |
|---|---|---|
| GB | 2415582 A | 12/2005 |
| GB | 2415583 | 12/2005 |
| JP | 11239194 A | 8/1999 |
| JP | 2001292130 A | 10/2001 |

(Continued)

OTHER PUBLICATIONS

Rabih Chrabieh et al, "Reed Solomon Code vs. Repetition in WiMedia UWB", IEEE International Conference on Ultra-Wideband, Sep. 24-26, 2007, pp. 669-673, IEEE ICUWB, Singapore.

(Continued)

*Primary Examiner* — Ajay Bhatia
*Assistant Examiner* — Dipakkumar Gandhi
(74) *Attorney, Agent, or Firm* — Qualcomm Patent Group; Jonathan Velasco; James H. Yancey, Jr.

(57) ABSTRACT

An apparatus for coding a communication signal is provided. The apparatus includes an encoder configured to encode the communication signal, to increase the length of the communication signal, and a repetition coder configured to repetitively code part of the encoded communication signal, to utilize at least some of the increased length of the communication signal. The apparatus further includes an interleaver configured to interleave the repetitively coded communication signal. A method is also provided for coding a communication signal.

84 Claims, 16 Drawing Sheets

FOREIGN PATENT DOCUMENTS

| | | |
|---|---|---|
| JP | 2004503173 A | 1/2004 |
| JP | 2004505489 | 2/2004 |
| JP | 2007506359 | 3/2007 |
| KR | 20020006592 A | 1/2002 |
| KR | 20030046237 A | 6/2003 |
| KR | 20030046273 A | 6/2003 |
| RU | 2258314 | 10/2005 |
| RU | 2266623 | 12/2005 |
| TW | I246267 | 12/2005 |
| WO | WO9512943 A1 | 5/1995 |
| WO | 0205445 | 1/2002 |
| WO | WO03039056 A1 | 5/2003 |
| WO | WO2005036846 | 4/2005 |

OTHER PUBLICATIONS

International Search Report—PCT/US08/057130—International Search Authority, European Patent Office—Aug. 6, 2008.
Written Opinion—PCT/US08/057130—International Search Authority, European Patent Office—Aug. 6, 2008.
IEEE STD 802.15.3-2003, IEEE Standard for Information technology—Telecommunications and information sxchange between systems—Local and metropolitan area networks—Specific requirements, Part 15.3: Wireless Medium Access Control (MAC) and Physical Layer (PHY) Specifications for High Rate Wireless Personai Area Networks (WPANs), Sep. 29, 2003.
Taiwan Search Report—TW097109411—TIPO—Apr. 16, 2012.

* cited by examiner

Fig. 1. WiMedia's header construction.

DEVICE
1602

MODULE FOR FOR ENCODING THE COMMUNICATION SIGNAL, SO AS TO INCREASE THE LENGTH OF THE COMMUNICATION SIGNAL
1604

MODULE FOR REPETITIVELY CODING PART OF THE COMMUNICATION SIGNAL, TO UTILIZE AT LEAST SOME OF THE INCREASED LENGTH OF THE COMMUNICATION SIGNAL
1606

MODULE FOR INTERLEAVING THE REPETITIVELY CODED COMMUNICATION SIGNAL
1608

FIG. 16

METHOD AND APPARATUS FOR CODING A COMMUNICATION SIGNAL

CLAIM OF PRIORITY UNDER 35 U.S.C. §119

The present Application for Patent claims priority to Provisional Application No. 60/895,427 entitled "REPETITION CODING IN ULTRA WIDEBAND COMMUNICATIONS" filed Mar. 16, 2007, and assigned to the assignee hereof and hereby expressly incorporated by reference herein.

BACKGROUND

1. Field

The present invention generally relates to wireless communication, and more specifically to a method and apparatus for encoding a wireless communication signal.

2. Background

In the field of wireless communication, sophisticated error correction methods are desired to verify the integrity of transmitted data, and to correct errors that can arise during transmission. In addition, as bandwidth increases, the error rate associated with wireless communication typically increases.

When implementing new error correction coding, it is sometimes desired for the new coding to be compatible with existing error correction code formats. In this way, data having the new error correction code format can still be compatible with older devices. At other times, such backward compatibility is not desired, particularly if the backward compatibility decreases performance. Therefore, there is a need for encoding data with improved error correction, leading to reduced cost, size and power. In addition, it is desired for such encoding to be compatible with existing error correction code formats.

SUMMARY

In one aspect of the disclosure, an apparatus for coding a communication signal is provided. The apparatus includes an encoder configured to encode the communication signal, to increase the length of the communication signal, and a repetition coder configured to repetitively code part of the encoded communication signal, to utilize at least some of the increased length of the communication signal. The apparatus further includes an interleaver configured to interleave the repetitively coded communication signal.

In a further aspect of the disclosure, a method for coding a communication signal is provided. The method includes encoding the communication signal, to increase the length of the communication signal, and repetitively coding part of the encoded communication signal, to utilize at least some of the increased length of the communication signal. The method further includes interleaving the repetitively coded communication signal.

In yet a further aspect of the disclosure, an apparatus for coding a communication signal is provided. The apparatus includes means for encoding the communication signal, to increase the length of the communication signal, and means for repetitively coding part of the encoded communication signal, to utilize at least some of the increased length of the communication signal. The apparatus further includes means for interleaving the repetitively coded communication signal.

In yet a further aspect of the disclosure, a processor for coding a communication signal is provided. The processor includes an encoder configured to encode the communication signal, to increase the length of the communication signal, and a repetition coder configured to repetitively code part of the encoded communication signal, to utilize at least some of the increased length of the communication signal. The processor further includes an interleaver configured to interleave the repetitively coded communication signal.

In yet a further aspect of the disclosure, a machine-readable medium encoded with instructions for coding a communication signal is provided. The instructions include code for encoding the communication signal, to increase the length of the communication signal, and code for repetitively coding part of the encoded communication signal, to utilize at least some of the increased length of the communication signal. The instructions further include code for interleaving the repetitively coded communication signal.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

FIG. 16 is a conceptual block diagram illustrating an example of the functionality of a device for coding a communication signal.

DETAILED DESCRIPTION

Figure 1:
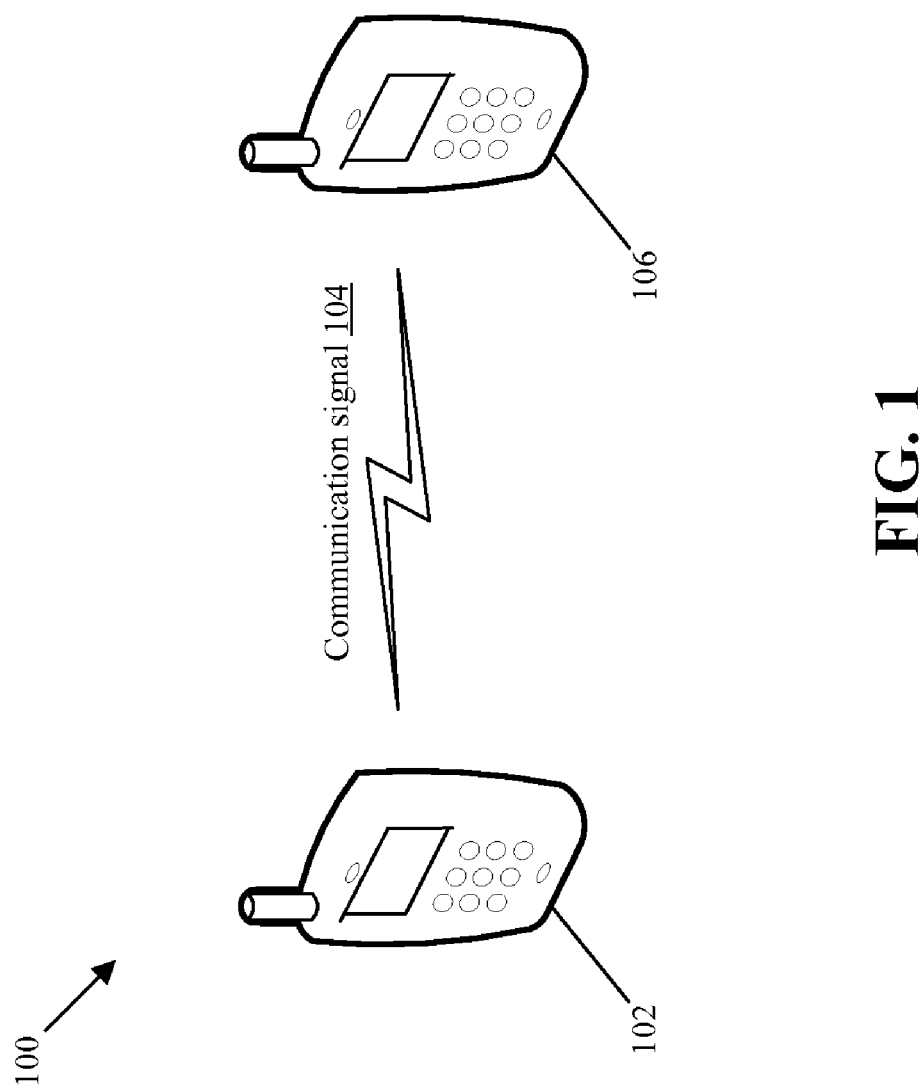
FIG. 1 is a diagram illustrating an example of a wireless communication system in which encoding of a communication signal can be used.

FIG. 1 is a diagram illustrating an example of a wireless communication system 100 in which encoding of a communication signal can be used. System 100 includes at least one transmitter 102 and one receiver 106, which may for example be both constituted by devices such as mobile phones. Although devices 102 and 106 are depicted as mobile phones, they should not be limited as such. Devices 102 and 106 can represent, for example, a computer, a laptop computer, a telephone, another type of mobile phone, a personal digital assistant (PDA), an audio player, a game console, a camera, a camcorder, an audio device, a video device, a multimedia device, a component(s) of any of the foregoing (such as a printed circuit board(s), an integrated circuit(s), and/or a circuit component(s)), or any other device capable of supporting wireless communication. Devices 102 and 106 can be stationary or mobile, and they can be digital devices.

Transmitter 102 can transmit a communication signal 104 to receiver 106. Transmitter 102 can encode communication signal 106 before it is transmitted to receiver 106, and receiver 106 can decode the encoded communication signal 106.

In this regard, communication system 100 can correspond with an Ultra-Wideband (UWB) system, which is a radio technology for Wireless Personal Area Networks (WPAN). Communication system 100 may use one of many other communications protocols. By way of example, communication system 100 may support Evolution-Data Optimized (EV-DO) and/or Ultra Mobile Broadband (UMB). EV-DO and UMB are air interface standards promulgated by the 3rd Generation Partnership Project 2 (3GPP2) as part of the CDMA2000 family of standards and employ multiple access techniques such as Code Division Multiple Access (CDMA) to provide broadband Internet access to mobile subscribers. Alternatively, communication system 100 may support Long Term Evolution (LTE), which is a project within the 3GPP2 to improve the Universal Mobile Telecommunications System (UMTS) mobile phone standard based primarily on a Wideband CDMA (W-CDMA) air interface. Communication system 100 may also support the WiMAX standard associated with the WiMAX forum. These are merely exemplary protocols, and communication system 100 is not limited to these examples.

The actual communications protocol(s) employed by communication system 100 will depend on the specific application and the overall design constraints imposed on the system. The various techniques presented throughout this disclosure are equally applicable to any combination of heterogeneous or homogeneous communication system 100.

Referring back to UWB, this radio technology typically provides different transmission options for both low and high data rates. For example, WiMedia UWB is a data rate standard, with current raw data rates from 53.3 Mbps up to 480 Mbps. The standard is based on Orthogonal Frequency Division Multiplexing (OFDM). Since it is meant to equip a wide array of consumer electronics, the design stresses low cost hardware and low power consumption. Low power consumption is generally achieved via duty cycling, where packets are burst at high data rate, and the device can nearly shutdown between packets, thereby saving power.

Figure 2:
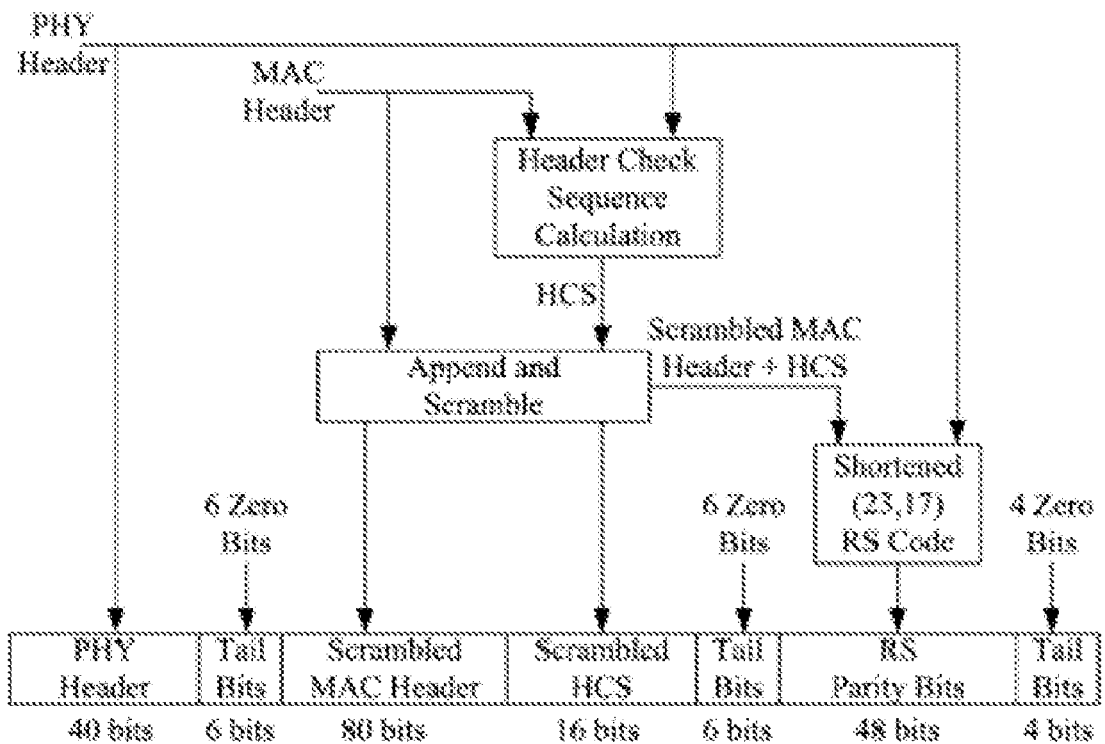
FIG. 2 is a conceptual block diagram illustrating an example of a Reed Solomon (RS) code header construction for a communication signal.

FIG. 2 is a conceptual block diagram illustrating an example of a Reed Solomon (RS) code header construction for a communication signal. RS code has recently been added to the WiMedia standard, for protection of the header information. In this regard, although the RS code header corresponds to the adopted header construction for WiMedia physical layer, other header construction formats can be used. A repetition code header format will be described in greater detail below.

In general, the header contains information that is typically needed to decode the rest of a data packet (e.g., the payload). While the payload can be transmitted at either low or high data rate, the header is typically transmitted at low data rate to ensure high protection against channel impairments and noise.

One of WiMedia's original designs for the header structure (not shown) was to append 52 zero bits to 148 pre-specified data bits, to make the header compatible with the interleaver size. In this regard, the Reed Solomon bits in FIG. 2 used to use zero padding. Hence, there were 52 bits that the receiver did not use.

Another design for the header structure incorporated by WiMedia is depicted in FIG. 2. In this design, the 52 appended zero bits are used for additional header protection. In this example, even if payload coding is improved, the header coding will still likely be stronger than the payload coding.

When operating at the lowest data rate (53.3 Mbps), and when the payload length is short, a decent amount of packet errors can result from header errors. By strengthening the header, the Packet Error Rate (PER) is seen to improve. In addition, a more robust header is seen to provide better visibility of neighboring devices and piconets. The Media Access Control (MAC) could then make better scheduling decisions and resource assignment. In this regard, it should be noted that it is not necessary to decode the neighbor's payload, and all that is needed is to decode the header. A map can be made of what devices are around and what sort of resources they are using.

As noted above, the adopted construction by WiMedia for the 52 padded header bits is Reed Solomon code. The design of this code is backward compatible, so that old devices which ignore the 52 padding bits can continue to function normally. The RS code can satisfy this condition since it is a systematic code. In other words, the information bits are sent as is, and parity bits are inserted in the position of the 52 padding bits. Old devices can ignore the parity bits and their performance is typically unchanged. New devices can use the parity bits to enhance performance.

The RS code was chosen to be a (23, 17) systematic code, which is obtained by shortening a (255, 249) systematic code. This code is capable of correcting up to 3 bytes of errors in any of the 23 transmitted bytes. The code's parity is typically calculated based on Physical Layer (PHY) header (5 bytes), MAC header (10 bytes) and Cyclic Redundancy Check (CRC) (2 bytes). The CRC is typically needed to check that the decoding operation succeeded. The total RS code's information is 17 bytes. The parity bits consist of 6 bytes (48 bits out of 52).

The remaining 4 bits out of 52 are used as tail bits for a convolutional encoder, which will be described in greater detail below. The total number of bytes for the RS code, information plus parity, is 23 bytes.

Figure 3A:
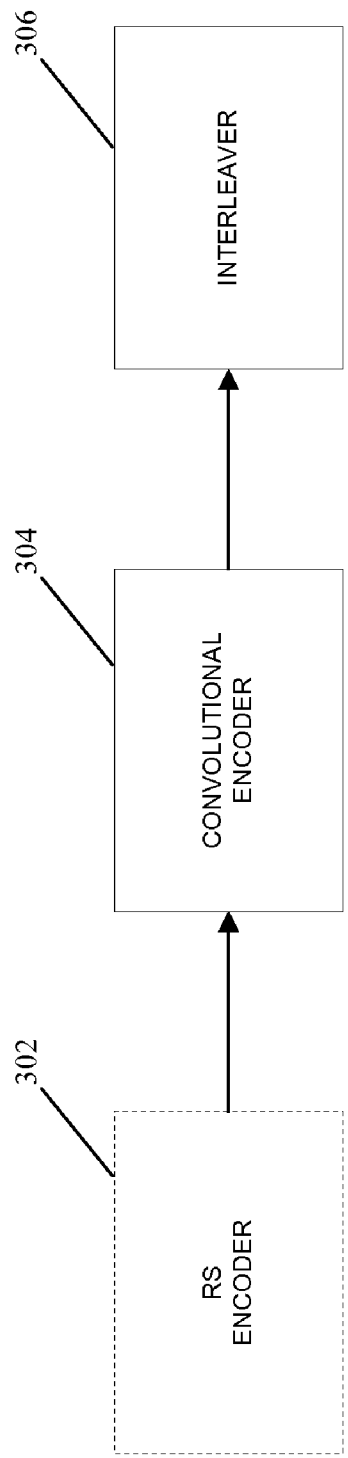
FIGS. 3A and 3B are conceptual block diagrams illustrating a comparison of the functionality of a device for coding a communication signal, without repetition coding and with repetition coding respectively.
Figure 3B:
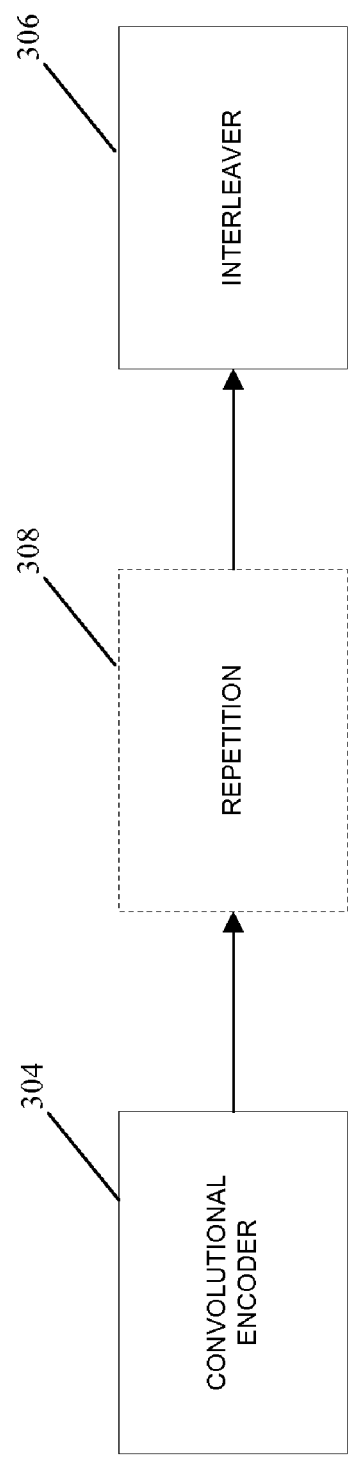

FIGS. 3A and 3B are conceptual block diagrams illustrating a comparison of the functionality of a device for coding a communication signal, without repetition coding and with repetition coding respectively. The dotted lines in these diagrams denote blocks which are present in one scheme, but not the other. As shown in FIG. 3A, which incorporates RS code instead of repetition coding, after the header is encoded by the outer RS encoder 302, it is sent to a rate 1/3 inner convolutional encoder 304. A constraint length of convolution encoder 304 is typically 7. After being encoded by convolutional encoder 304, the header is interleaved by interleaver 306.

Figure 4:
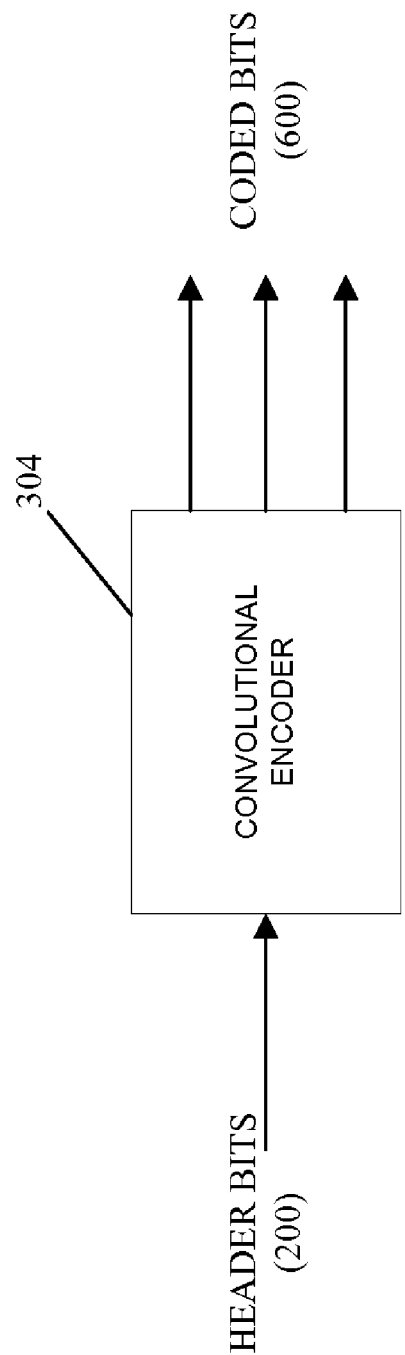
FIG. 4 is a conceptual block diagram illustrating an example of a convolutional encoder.

The total length of the header at the input of the convolutional encoder 304 is typically 200 bits, as depicted in FIG. 4. Thus, at the output of the convolutional encoder 304, the total length is 200×3=600 coded bits.

With reference to FIG. 3B, if RS encoder 302 is removed, and a repetition code 308 is added, then same or better performance can be realized in most cases, with less hardware and less power demand. Rather than considering the 52 padding bits before convolutional encoder 304, these bits can be considered after convolutional encoder 304.

Figure 5:
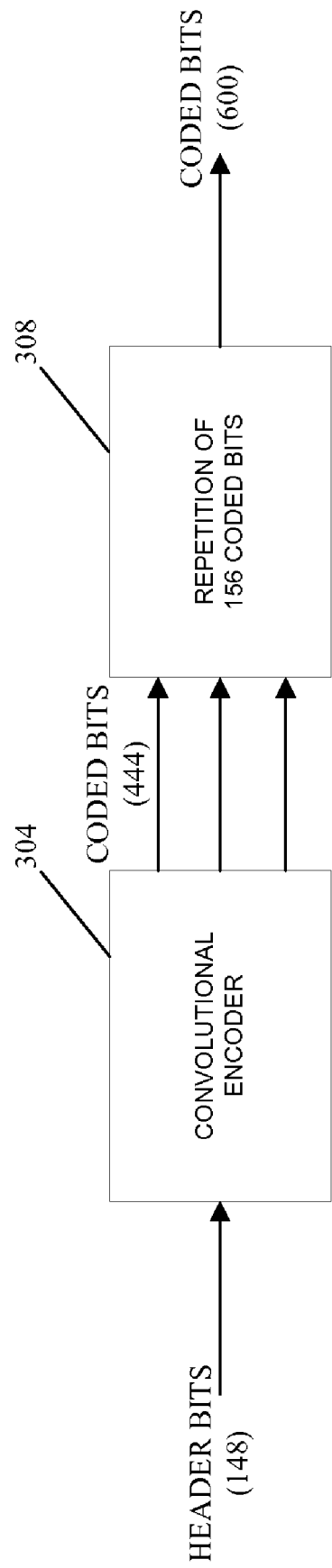
FIG. 5 is a conceptual block diagram illustrating an example of the functionality of a device for coding a communication signal.

FIG. 5 illustrates an example of the functionality of a device for coding a communication signal. As can be seen in this diagram, the 52 bits become 52×3=156 coded bits. On the other hand, the useful information bits typically are 200−52=148 bits. After convolutional encoder 304, they become 148×3=444 coded bits. Therefore, just 148 useful information bits can be sent through convolutional encoder 304 to obtain 444 coded bits. Then a repetition pattern can be applied at block 308, repeating 156 coded bits, to fill up the gap and obtain 600 coded bits, as required by the next stage (interleaver 306 of FIG. 3B).

One example of repetition pattern is to repeat all the coded bits from the upper branch of convolutional encoder 304 (e.g., 148 repeated coded bits) and 8 more bits from the lower branch of convolutional encoder 304 spaced apart by 54 bits. In other words, the following coded bits can be repeated: 0 to 441, in steps of 3; and 2 to 380 in steps of 54.

In this regard, other repetition patterns can be used. For example, one relatively simple scheme can use a fractional step to select which bits are to be repeated. This will be described in greater detail below with reference to FIG. 6B.

Referring to FIG. 3B, the total number of repeated bits is typically 156. Two options for repeating bits are as follows:

The repeated bits can be appended to the end to form 600 coded bits.

The repeated bits can be inserted in between the original bits.

With reference to the first option of appending repeated bits, this option can maintain backward compatibility with older devices that ignore the repetition bits. The receiver decoding process for this repetition scheme is seen to be rather simple (e.g., simple adder and counter logic) compared to RS decoding. In addition, new devices can take advantage of the repetition section, or they can ignore it if they wish to save power when the MAC decides that there is no need for the extra performance. Although there are typically buffering requirements associated with this approach, buffering requirements are also present in the RS code approach.

With reference to the second option of inserting repeated bits in between original bits, this approach is seen to be simpler from a hardware perspective, and there is typically no need for buffering. However, backward compatibility is typically lost. In this case, a MAC message or a special header bit may signal the type of header format (e.g., old or new header format).

In addition to the above-described advantages for repetition coding within a header, latency added due to trivial processing is relatively negligible. With RS coding, on the other hand, an RS decoder can introduce a noticeable latency due to consequential processing. The latency implies additional buffering of received signal.

One issue to be taken into account at the receiver side for repetition coding is the bit width at the input of a Viterbi decoder. After undoing repetition, the bit width can increase by 1 bit and saturation may occur.

In addition to the header, repetition coding can also be extended for use in the payload. For example, the repetition block can be used to protect short payloads, and possibly to implement lower data rates, thus increasing range. In this regard, any short payload can automatically benefit (e.g., short voice packets transmitted every 20 ms). Also, the empty padding before the convolutional encoder can be replaced with a repetition code after the convolutional encoder.

Figure 6A:
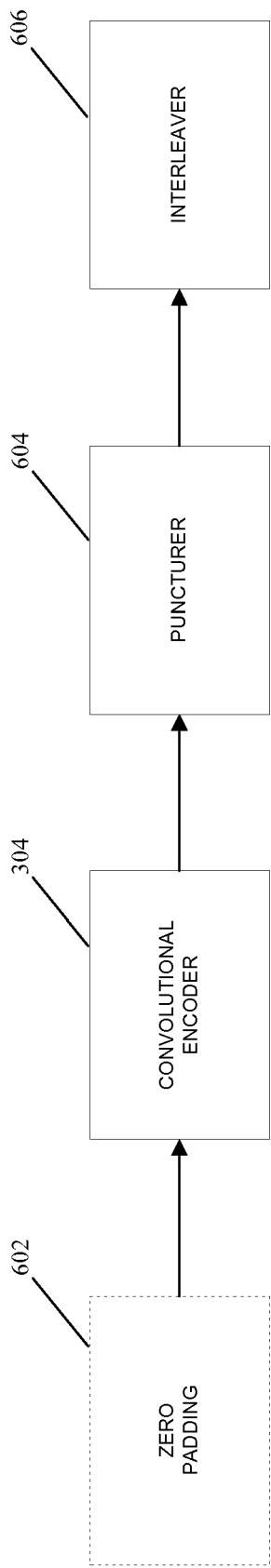
FIGS. 6A and 6B are conceptual block diagrams illustrating another comparison of the functionality of a device for coding a communication signal, without repetition coding and with repetition coding respectively.
Figure 6B:
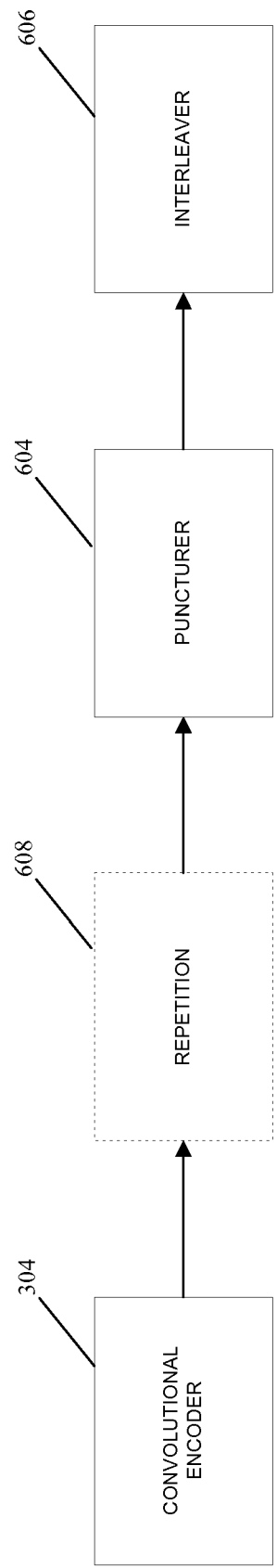

FIGS. 6A and 6B are a conceptual block diagrams illustrating another comparison of the functionality of a device for coding a communication signal, without repetition coding and with repetition coding respectively. FIG. 6A depicts use of a zero padding block 602, convolutional encoder 304, puncturer 604, and interleaver 606. FIG. 6B, on the other hand, depicts use of a convolutional encoder 304, repetition block 608, puncturer 604 and interleaver 606.

As can be seen in FIG. 6B, repetition block 608 can be inserted between convolutional encoder 304 and puncturer 604. On the receiver side (not shown), repetition block 608 can inserted between a de-puncturer and a Viterbi decoder. Zero padding (see element 602 of FIG. 6A) is typically not performed. Instead, the size of the zero padding area is supplied to repetition block 608 in order to compute the step size between repeated bits. The repeated bits can be placed in the area reserved for zero padding in order to maintain backward compatibility. In such a case, additional buffering may be needed.

However, in a case where backward compatibility is not necessary, a flag in the header can indicate that payload repetition is enabled. This way, the repeated bits can be mixed with the original bits, and no buffering would be required.

In addition, the step size between repeated bits can be a fractional number that is cumulated until it crosses an integer boundary. Every time the fractional number crosses the boundary, one bit can be repeated. This step size can also consist of 3 fractional numbers, one per branch of convolutional encoder 304.

It should be noted that repetition block 608 can also serve to decrease payload data rates below the current 53.3 Mbps, in order to increase the range. The amount of repetition can be signaled in the header. Repetition block 608 can calculate an integer or fractional step size and repeat bits accordingly. For example, 53.3 Mbps can be divided by 4 to obtain a data rate of 13.3 Mbps, a spreading gain of 6 dB which approximately doubles the range. The repeated bits can be inserted in between the coded bits. Further, interleaver 606 can automatically distribute the repeated bits over different subcarriers and frequency bands. However, at the increased range, the header itself is preferably transmitted at a lower data rate via repetition. In addition, the preamble is typically extended in length, which may make the performance of simple preamble detection algorithms difficult.

Figure 7A:
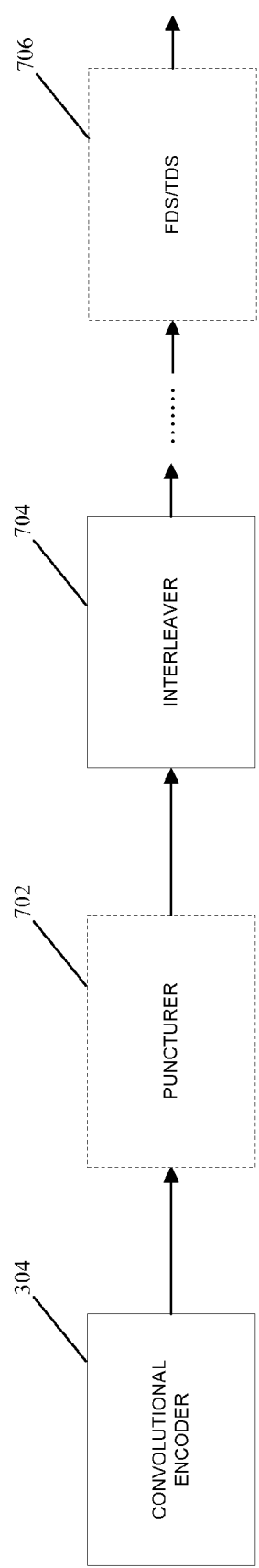
FIGS. 7A and 7B are conceptual block diagrams illustrating yet another comparison of the functionality of a device for coding a communication signal, without repetition coding and with repetition coding respectively.
Figure 7B:
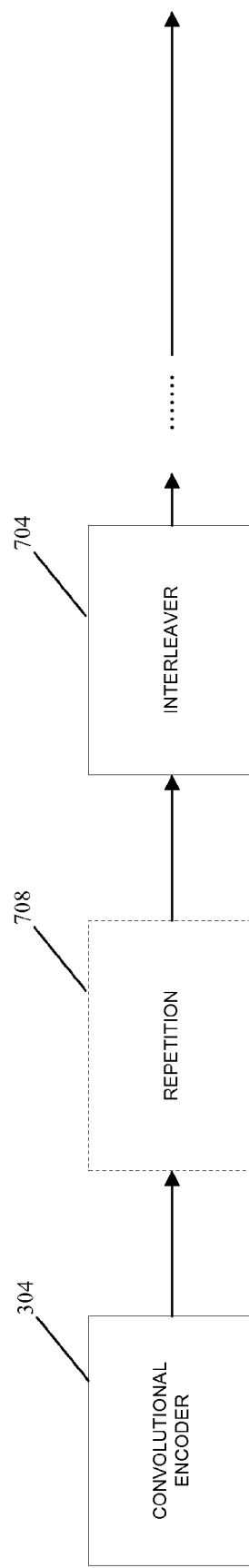

As noted above, repetition coding can be used within a header and/or payload. In addition to these uses, repetition code can sometimes be used as a substitute for WiMedia's Frequency Domain Spreading (FDS) and Time Domain Spreading (TDS). FDS and/or TDS can correspond to a spreader or a spreading method. This repetition code can provide for better performance as a trade for its higher power consumption. FIGS. 7A and 7B are a conceptual block diagrams illustrating a comparison of the functionality of a device for coding a communication signal, without repetition coding and with repetition coding respectively. FIG. 7A includes a convolutional encoder 304, puncturer 702, interleaver 704 and FSD/TDS block 706. FIG. 7B, on the other hand, depicts a convolutional encoder 304, repetition block 708 and an interleaver 704.

For certain data rates (e.g., 80 Mbps and 200 Mbps), Frequency Domain Spreading (FDS) and Time Domain Spreading (TDS) coding methods are not preferred. At least two reasons for this are as follows:

The FDS and TDS methods typically apply a form of repetition after puncturing, resulting in a coding loss, even in AWGN (e.g., About 0.25 dB loss for 80 Mbps, and 0.6 dB for 200 Mbps);

These methods typically apply a form of repetition after interleaving, which results in a diversity loss in non-AWGN channels, and improper interleaving properly. This occurs mostly when frequency band hopping is turned off (e.g., About 0.5 dB loss for 53 Mbps, and 1 dB loss for 80 Mbps in channel model CM2 without band hopping).

For example, in one scenario, more than 1 dB loss is exhibited. Although FDS and TDS are seen to perform poorly at certain data rates, these methods (e.g., use of puncturer 702 of FIG. 7A) allow for hardware to run at a lower speed and to save power. Hence, the repetition coding scheme of FIG. 7B can sometimes be used to trade power for performance, and the header can signal what scheme is in use. The repetition coding scheme depicted in FIG. 7B is seen to provide an improved form of repetition, and is seen to recover the loss associated with the scheme depicted in FIG. 7B.

In FIG. 7A, if convolutional encoder 304 receives an input having a bit rate of 200 Mbps, then convolutional encoder 304 may generate coded data at 600 Mbps, which is three times the input rate. The coded data may be sent to puncture block 702 to produce a coded bit rate of 320 Mbps, which may be repeated twice via TDS to obtain a final coded bit rate of 640 Mbps. This can be mapped onto, for example, QPSK tones.

Figure 8:
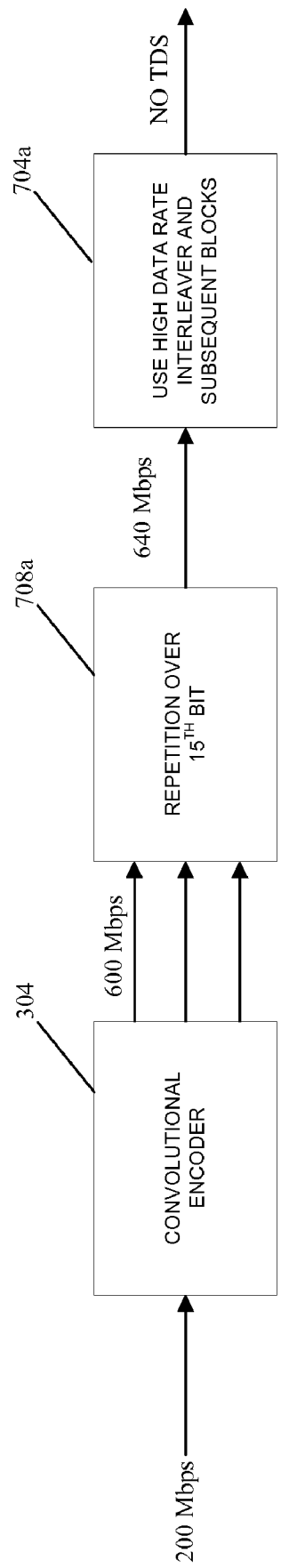
FIG. 8 is a conceptual block diagram illustrating another example of the functionality of a device for coding a communication signal.

FIG. 8 is a conceptual block diagram illustrating another example of the functionality of a device for coding a communication signal. Referring to both FIGS. 7B and 8, input data having a bit rate of 200 Mbps is applied to convolutional encoder 304 in this example. After convolutional encoder 304, the coded bit rate is typically three times higher, or 600 Mbps. In this example, puncturing is not performed after convolutional encoder 304. Rather, repetition block 708 can repeat a fraction of the 600 Mbps to obtain the coded bit rate of 640 Mbps. For instance, repetition block 708a can repeat once every 15th coded bit. This can then be mapped onto, for example, QPSK tones. This repetition is also seen to allow for hardware to run at lower speed and save power, similar to TDS and FDS.

Still referring to FIGS. 7B and 8, the coded bit rate of 640 Mbps before interleaver 704 is similar to the rate obtained by existing high data rates such as 480 Mbps. Hence, block 704a—which may, for example, include interleaver 704 and other subsequent blocks—can be set in high data rate mode, with typically no additional hardware being required. Also, the Fast Fourier transform (FFT) typically runs twice faster in high data rate modes.

Figure 9:
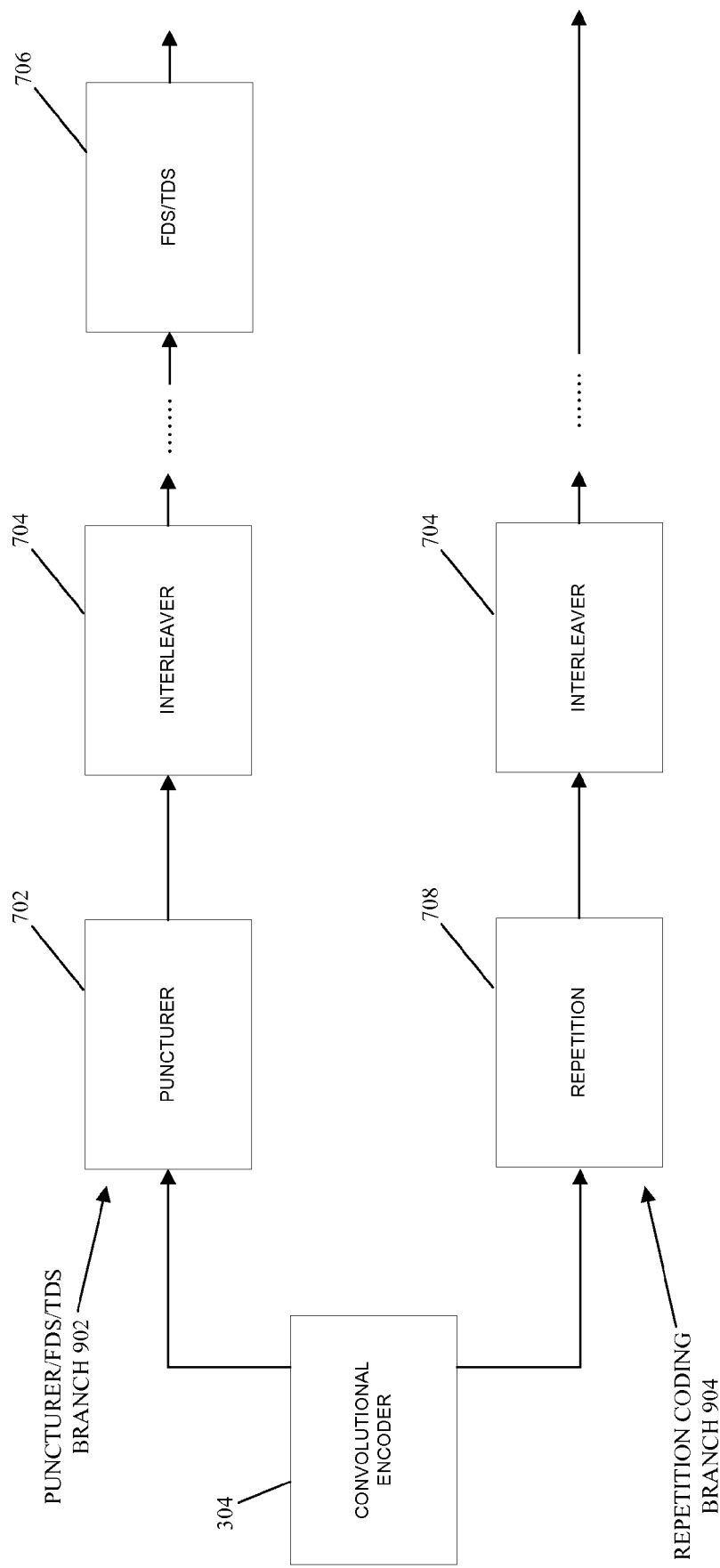
FIG. 9 is a conceptual block diagram illustrating yet another example of the functionality of a device for coding a communication signal.

FIG. 9 is a conceptual block diagram illustrating yet another example of the functionality of a device for coding a communication signal. As noted above with reference to FIGS. 7A and 7B, a repetition coding scheme can sometimes be used instead of a puncturer/FDS/TDS scheme in order to trade power for performance, and the header can signal which scheme is in use.

In the example of FIG. 9, the repetition coding scheme is depicted as branch 904, and the puncturer/FDS/TDS scheme is depicted as branch 902. Additionally, a selector (not shown) can be used for selecting between branches 902 and 904. The selector can select a branch based on, for example, the tradeoff between power and performance. For example, for data rates such as 80 Mbps and 200 Mbps, the selector can select repetition coding branch 904. If the selector selects repetition coding branch 904, interleaver 704 and subsequent blocks (see, e.g., block 704a in FIG. 8) can use a high data rate mode.

A selector can be implemented before convolutional encoder 304 or within convolutional encoder 304. A selector can also be implemented after convolutional encoder 304 but before puncturer 702 or repetition block 708 (or 708a in FIG. 8).

In summary, repetition coding can be used within the header, payload and/or at times to substitute FDS/TDS coding. The repetition coding is seen to provide for improved error correction, cost, size and power. In addition, such encoding can be compatible with existing error correction code formats.

Figure 10:
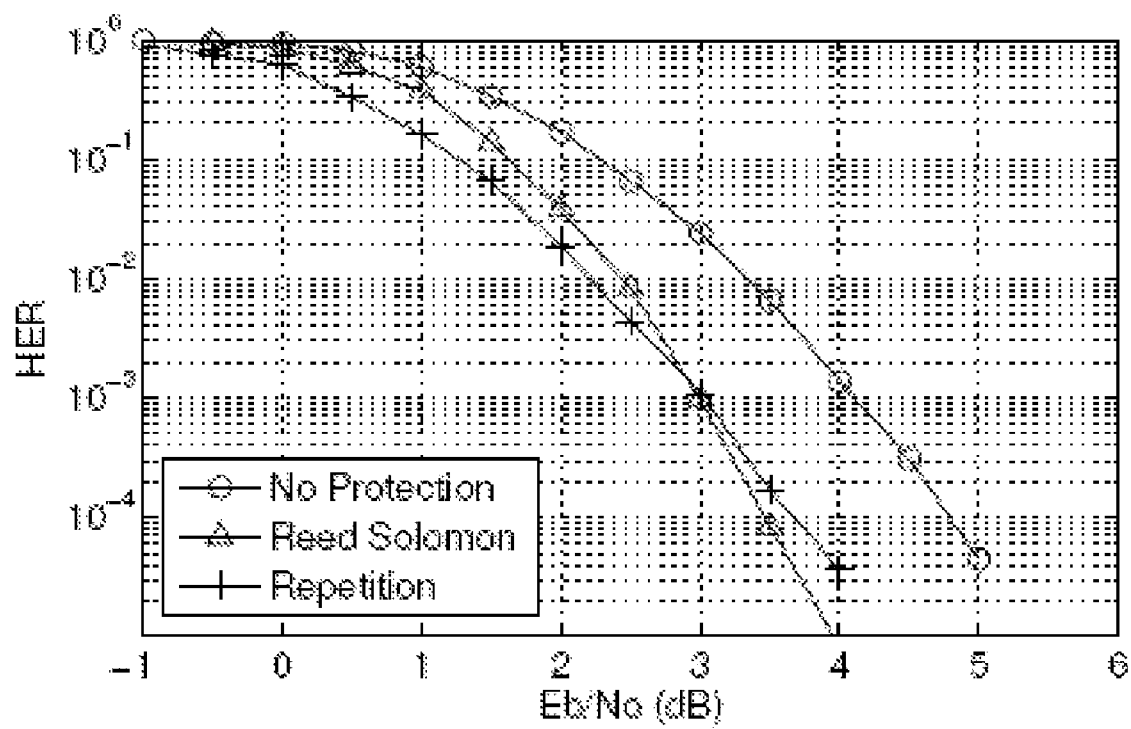
FIG. 10 is a graph illustrating an example of the performance of Reed Solomon (RS) coding versus repetition coding in Additive White Gaussian Noise (AWGN).
Figure 11:
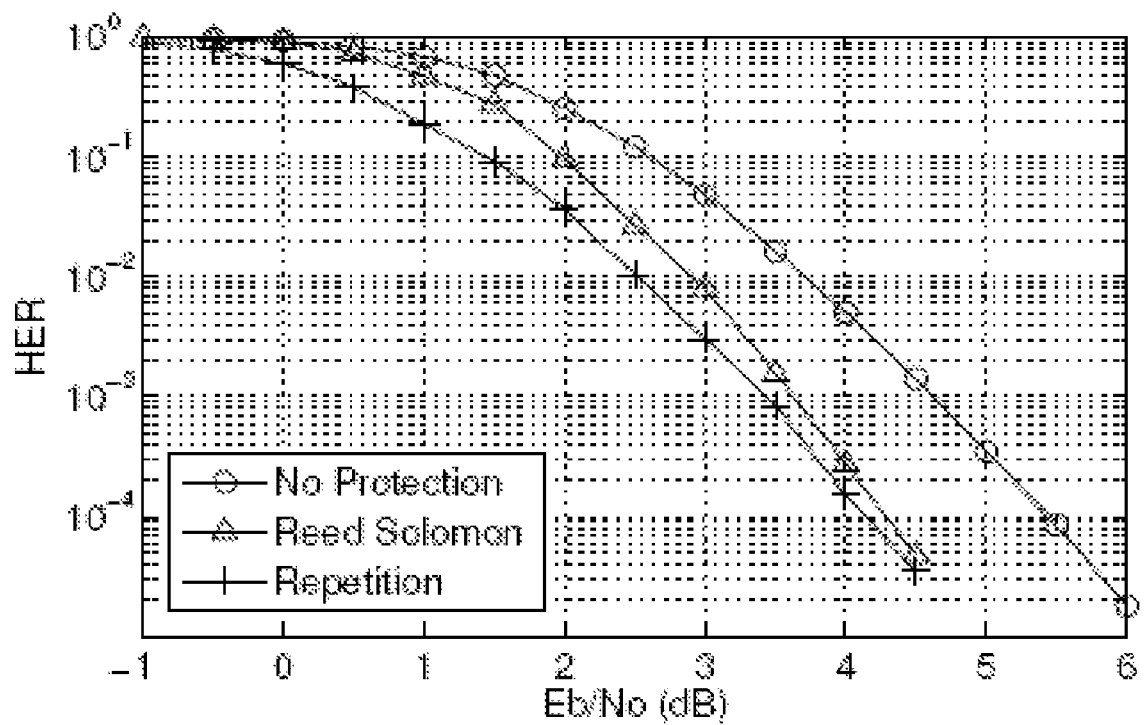
FIG. 11 is a graph illustrating an example of the performance of Reed Solomon (RS) coding versus repetition coding in a CM2 and FFI mode.
Figure 12:
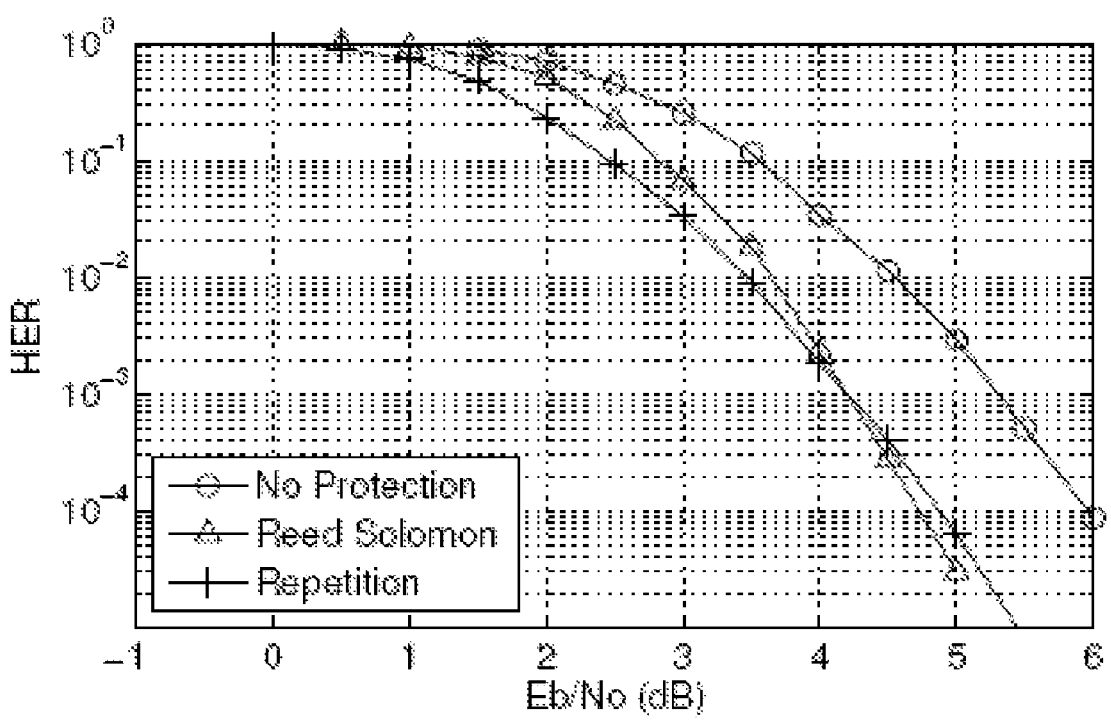
FIG. 12 is a graph illustrating an example of the performance of Reed Solomon (RS) coding versus repetition coding in a CM2 and TFI mode.

A more detailed description of the simulated performance of repetition coding will now be provided. FIGS. 10 to 12 are graphs illustrating an example of the performance of repetition coding in Additive White Gaussian Noise (AWGN). More particularly, FIG. 10 illustrates an example of the performance of Reed Solomon (RS) coding versus repetition coding in Additive White Gaussian Noise (AWGN). FIG. 11 illustrates an example of the performance of Reed Solomon (RS) coding versus repetition coding in a CM2 and FFI mode. FIG. 12 illustrates an example of the performance of Reed Solomon (RS) coding versus repetition coding in a CM2 and TFI mode.

In these diagrams, CM2 corresponds with IEEE 802.15.3's Channel Model 2 (CM2), but without shadowing. In addition, in FIG. 11, frequency band hopping is turned off, which corresponds with the Fixed Frequency Interleaving (FFI) in the WiMedia specification.

In FIG. 12, frequency band hopping is turned on, which corresponds with the Time and Frequency Interleaving (TFI). In TFI mode using repetition coding, three frequency bands are covered, and transmission power can be increased nearly threefold (~4.7 dB). The results give the Header Error Rate (HER) as a function of the signal to noise ratio, i.e., $E_b/N_0$.

As seen in FIG. 10, RS coding is only seen to outperform the repetition code at high $E_b/N_0$, which corresponds with low HER. This is typically when the RS code is useful, because errors are highly concentrated. However, the preferred range of interest is the range of HER that corresponds to a payload's Packet Error Rate (PER), which is typically much greater than $10^{-3}$. At this PER, a HER of about $10^{-4}$ is more than sufficient.

Still referring to FIG. 10, and within the typically useful range of HER >$10^{-4}$, repetition coding either outperforms RS coding or slightly under performs, by less than 0.2 dB. Moreover, the repetition code is more immune to shadowing given the higher performance at low $E_b/N_0$. Repetition coding is seen to be a much simpler code that provides sufficient header protection in the range of interest.

It should be noted that the performance in FFI mode (e.g., FIG. 11) appears to be better than in TFI mode (e.g., FIG. 12), since in FFI mode 6 symbols are dedicated to channel estimation, whereas in TFI mode only 2 symbols are dedicated to channel estimation per frequency band. However, since in TFI mode the UWB device is allowed to transmit 3 times more power, this difference in performance will typically not exist in practical systems. The power constraint on FFI mode is seen to limit its capability. Hence, the two modes depicted by FIGS. 11 and 12 should not necessarily be compared directly.

As seen in FIGS. 10 to 12, the repetition code in many cases outperforms the RS code. One reason is that the original RS code is (255, 249), with which the repetition code cannot compete, since in 6 out of 249 bytes, there is typically no room for enough repetition. But after shortening the code to (23, 17), the repetition code has a chance to compete. In 6 out of 17 bytes, there is typically room for sufficient repetition.

More particularly, at low HER (e.g., say $10^{-3}$), after Viterbi decoding, there is typically at most one error event in a packet. This error event can translate into a contiguous segment of incorrect bits that extends over 1, 2, 3 or more consecutive bytes. When the error is less than or equal to 3 bytes, the RS code can typically correct the error. However, if the error is 4 or more bytes, the RS code typically fails.

The error event length in bytes, after the Viterbi decoder, is fairly independent of the length of the packet. Rather, the error event length typically only depends on the operating $E_b/N_0$ to achieve the HER of $10^{-3}$. Hence, regardless of the size of the packet (23 bytes or 255 bytes), at the desired operating $E_b/N_0$, there will be typically only a single error event of length of the order of 3 bytes. The RS code provides a fixed gain as follows:

$$\text{RS Code Gain} \approx 1.3 \text{ dB} \qquad \text{(Equation 1)}$$

whether the packet length is 23 or 255 bytes. In this regard, a packet of 255 bytes corresponds to an unshortened RS code, while a packet of 23 bytes corresponds to a much shortened version.

On the other hand, the gain of repetition coding typically does depend on the packet size. If denoting the header information length by n bytes, and the repetition length by m=6 bytes, and provided that the repetition bits can be properly distributed, the repetition gain can be as follows:

$$\text{Repetition Gain} = 10 \log_{10}(1 + m/(n-m)) \text{dB} \qquad \text{(Equation 2)}$$

The repetition gain is independent of the operating $E_b/N_0$. For n=255 bytes, the gain is only 0.1 dB, and it is typically difficult to properly distribute the repeated bits. For n=23 bytes, the gain is 1.3 dB, and the repetition bits can be smoothly distributed after convolutional encoder 304. Hence, repetition in WiMedia UWB is seen to offer similar gains to the RS code.

With reference to FIG. 11, it can be seen that for Additive White Gaussian Noise (AWGN), the errors tend to be well concentrated, often in less than 3 bytes. The Viterbi decoder manages to recover quickly from an error event. In the presence of a channel such as IEEE 802.15.3's Channel Model 2 (CM2), the errors tend to extend over more bytes: the Viterbi decoder has a harder time recovering from an error event because new input metrics can be weak. Hence, the RS code performs noticeably worse in the presence of a channel, with frequency band hopping turned off.

The reason for such worst performance can relate to diversity gain. While the repetition decoder acts before the Viterbi decoder and takes full advantage of diversity, the RS decoder operates after the Viterbi decoder and has nearly no diversity gain. In fact, WiMedia's current header encoding is seen to use suboptimal frequency and time domain spreading, and it is seen to lack diversity in FFI mode, which will be described in further detail below. Repetition code is seen to recover the diversity loss. In TFI mode as depicted in FIG. 12, the WiMedia encoding is seen to provide enough diversity, and hence both repetition and RS codes behave as in AWGN.

Figure 13:
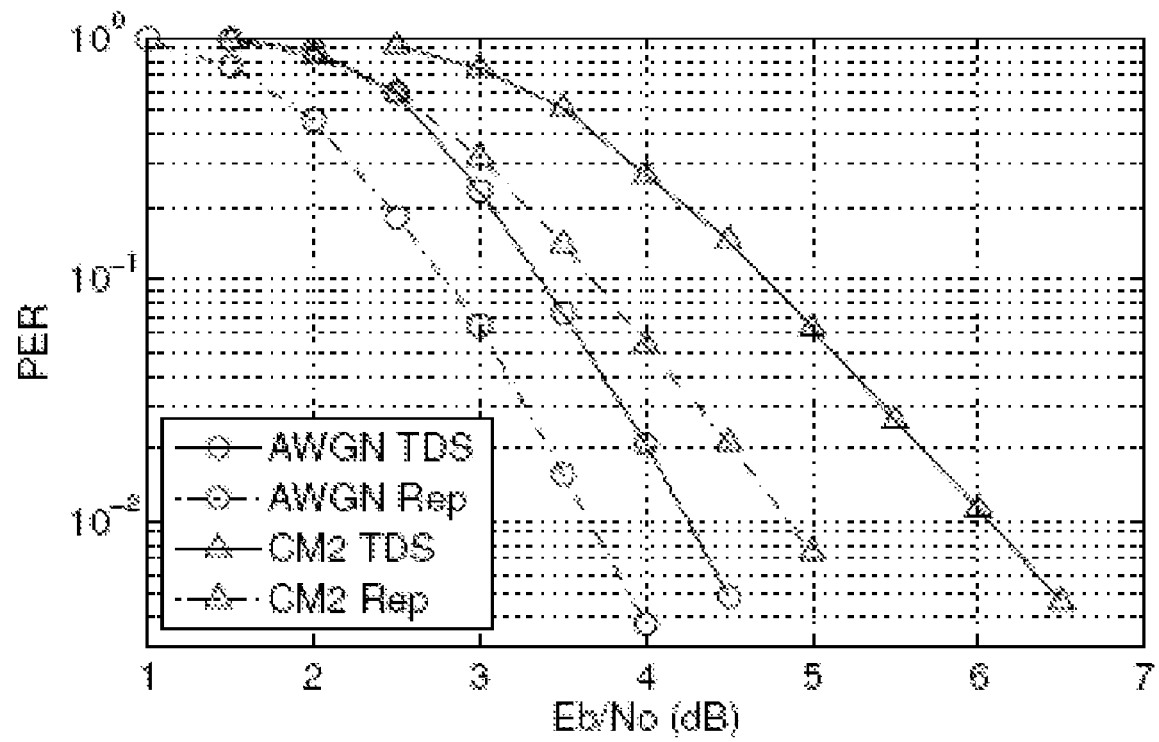
FIG. 13 is a graph illustrating an example of the performance of Time Domain Spreading coding versus repetition coding in an FFI mode.
Figure 14:
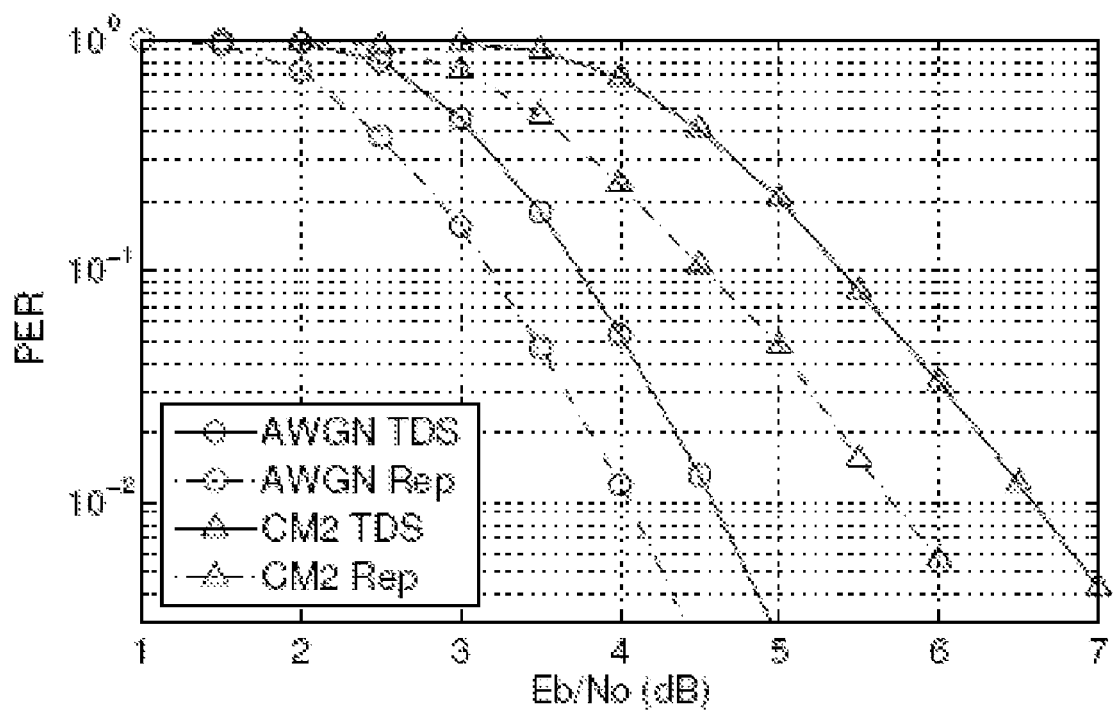
FIG. 14 is a graph illustrating an example of the performance of Time Domain Spreading coding versus repetition coding in a TFI mode.

FIGS. 13 and 14 provide further examples of performance of repetition coding. FIG. 13 depicts an example of the performance of Time Domain Spreading coding versus repetition coding in an FFI mode, and FIG. 14 illustrates an example of the performance of Time Domain Spreading coding versus repetition coding in a TFI mode. More particularly, FIG. 13 shows payload simulation results for 200 Mbps in Additive White Gaussian Noise (AWGN), and in IEEE 802.15.3's Channel Model 2 (CM2) but without shadowing, and in FFI Mode. FIG. 14 shows the same but in TFI mode. The results give the Packet Error Rate (PER) as a function of the signal to noise ratio, $E_b/N_0$.

As can be seen in FIGS. 13 and 14, in AWGN, the repetition code is seen to offer a coding gain of about 0.6 dB with respect to TDS. In addition, in CM2, the repetition code has a diversity gain of 0.6 dB in FFI mode and 0.3 dB in TFI mode. Hence, the total gain is 1.2 dB in FFI mode and 0.9 dB in TFI mode. Despite spreading, the TDS scheme is seen to lack some diversity in FFI mode.

Accordingly, by using performing repetition code instead of Reed Solomon code in WiMedia UWB, a simpler implementation with better performance can be realized. The encoder/decoder complexity of the proposed repetition scheme is almost negligible compared to that of Reed Solomon.

In addition, the repetition code scheme can be used for improving the system performance of short payloads, achieving lower-than 53.3 Mbps data rates, and transmitting the existing data rates in a more optimum way, when compared with spreading such as TDS and FDS.

Figure 15:
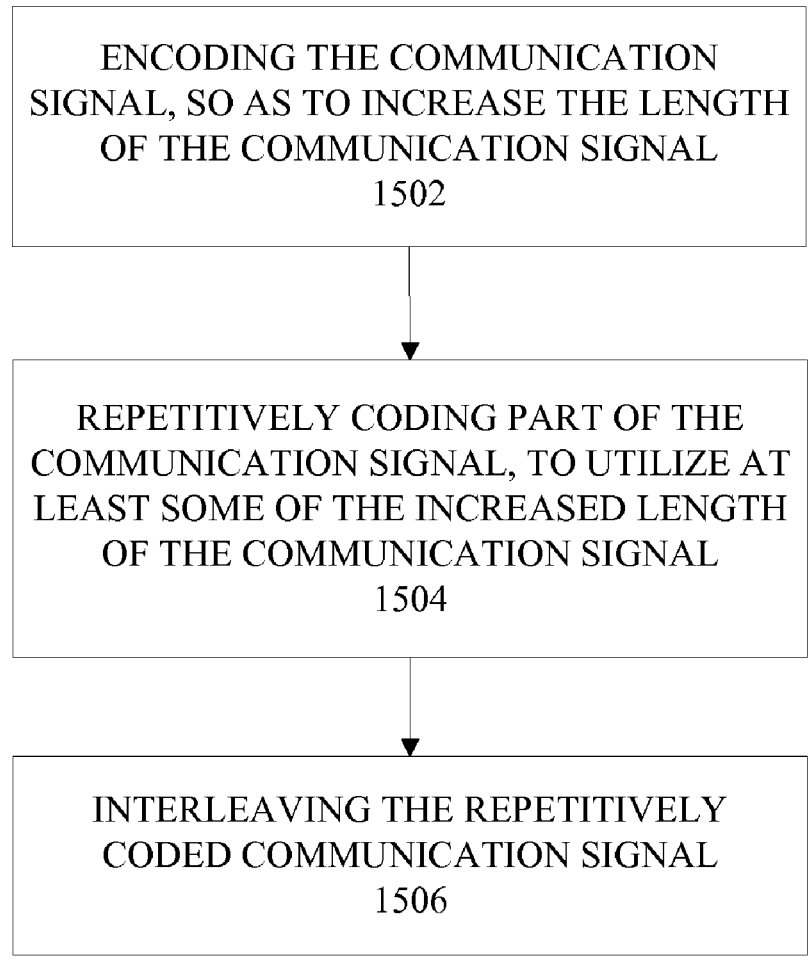
FIG. 15 is a flowchart illustrating an exemplary operation of coding a communication signal.

FIG. 15 is a flowchart illustrating an exemplary operation of coding a communication signal. In step 1502, a communication signal is encoded, to increase the length of the communication signal. In step 1504, part of the encoded communication signal is repetitively coded, to utilize at least some of the increased length of the communication signal. In step 1504, the repetitively coded communication signal is interleaved.

FIG. 16 is a conceptual block diagram illustrating an example of the functionality of a device for coding a communication signal. Device 1602 includes a module 1604 for encoding the communication signal, to increase the length of the communication signal. Device 1602 further includes a module 1606 for repetitively coding part of the encoded communication signal, to utilize at least some of the increased length of the communication signal. In addition, device 1602 includes a module 1608 for interleaving the repetitively coded communication signal.

Those of skill in the art would appreciate that the various illustrative blocks, modules, elements, components, methods, and algorithms described herein may be implemented as electronic hardware, computer software, or combinations of both. For example, each of the convolution encoder, repetition block and interleaver may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

Examples of particular communications protocols and formats have been given to illustrate the subject technology. However, the subject technology is not limited to these examples and applies to other communications protocols and formats.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus for coding a communication signal, comprising:
    an encoder configured to encode the communication signal and to increase a length of the communication signal;
    a repetition coder configured to repetitively code part of the encoded communication signal and to generate a repetitively coded communication signal that includes at least a MAC message or one or more header bits to signal a type of repetitive coding implemented in a header by the repetition coder; and
    an interleaver configured to interleave the repetitively coded communication signal.

2. The apparatus of claim 1, wherein the repetition coder is configured to append repeated bits to the encoded communication signal, the appended repeated bits to be used by an outside device.

3. The apparatus of claim 1, wherein the repetition coder is configured to append repeated bits to the encoded communication signal, the appended repeated bits to be ignored by an outside device.

4. The apparatus of claim 1, wherein the repetition coder is configured to insert repeated bits between original bits of the encoded communication signal, to reduce an amount of buffering associated with repetition coding.

5. The apparatus of claim 1, wherein the repetition coder is configured to use a fractional step to select which bits are to be repeated, the fractional step being associated with a step size between repeated bits, the step size being a fractional number which is cumulated until it crosses an integer boundary.

6. The apparatus of claim 1, wherein the communication signal comprises a header and a payload.

7. The apparatus of claim 6, wherein the repetition coder is configured to repetitively code the header of the encoded communication signal.

8. The apparatus of claim 6, wherein the repetition coder is configured to repetitively code the payload of the encoded communication signal.

9. The apparatus of claim 1, wherein the apparatus does not include an Reed Solomon (RS) coder immediately prior to the encoder.

10. The apparatus of claim 1, wherein an amount of repetition by the repetition coder is signaled via the MAC message.

11. The apparatus of claim 1, wherein an amount of repetition by the repetition coder is signaled in the one or more header bits.

12. The apparatus of claim 1, wherein the apparatus is a communication device having at least one transmit or receive antenna.

13. The apparatus of claim 1, further comprising:
    a first branch for processing the communication signal, the first branch comprising the repetition coder and the interleaver;
    a second branch for processing the communication signal, the second branch comprising:
        a puncturer coupled to the encoder and configured to puncture the encoded communication signal;
        a second interleaver configured to interleave the punctured communication signal; and
        a spreader configured to spread the interleaved communication signal; and
    a selector for selecting between the first branch and the second branch.

14. The apparatus of claim 1, wherein the interleaver is configured to use a high data rate mode to interleave the repetitively coded communication signal.

15. A method for coding a communication signal, the method comprising:
    encoding the communication signal and increasing a length of the communication signal;
    repetitively coding part of the encoded communication signal and generating a repetitively coded communication signal that includes at least a MAC message or one or more header bits to signal a type of repetitive coding implemented in a header; and
    interleaving the repetitively coded communication signal.

16. The method of claim 15, wherein the repetitively coding comprises appending repeated bits to the encoded communication signal, the appended repeated bits to be used by an outside device.

17. The method of claim 15, wherein the repetitively coding comprises appending repeated bits to the encoded communication signal, the appended repeated bits to be ignored by an outside device.

18. The method of claim 15, wherein the repetitively coding comprises inserting repeated bits between original bits of the encoded communication signal, to reduce an amount of buffering associated with repetition coding.

19. The method of claim 15, wherein the repetitively coding comprises using a fractional step to select which bits are to be repeated, the fractional step being associated with a step size between repeated bits, the step size being a fractional number which is cumulated until it crosses an integer boundary.

20. The method of claim 15, wherein the communication signal comprises a header and a payload.

21. The method of claim 20, wherein the repetitively coding comprises repetitively coding the header of the encoded communication signal.

22. The method of claim 20, wherein the repetitively coding comprises repetitively coding the payload of the encoded communication signal.

23. The method of claim 15, wherein the method does not perform Reed Solomon (RS) coding immediately prior to the encoding.

24. The method of claim 15, wherein an amount of repetition performed by the repetitively coding is signaled via the MAC message.

25. The method of claim 15, wherein an amount of repetition performed by the repetitively coding is signaled in the one or more header bits.

26. The method of claim 15, wherein the method is performed by a communication device having at least one transmit or receive antenna.

27. The method of claim 15, further comprising:
selecting one of a first branch and a second branch,
wherein if the first branch is selected, the steps of repetitively coding and interleaving are performed, and
wherein if the second branch is selected, the steps of repetitively coding and interleaving are replaced with the steps of:
puncturing the encoded communication signal;
interleaving the punctured communication signal; and
spreading the interleaved communication signal.

28. The method of claim 15, wherein the interleaving uses a high data rate mode to interleave the repetitively coded communication signal.

29. An apparatus for coding a communication signal, comprising:
means for encoding the communication signal and increasing a length of the communication signal;
means for repetitively coding part of the encoded communication signal and generating a repetitively coded communication signal that includes at least a MAC message or one or more header bits to signal a type of repetitive coding implemented in a header; and
means for interleaving the repetitively coded communication signal.

30. The apparatus of claim 29, wherein the means for repetitively coding is configured to append repeated bits to the encoded communication signal, the appended repeated bits to be used by an outside device.

31. The apparatus of claim 29, wherein the means for repetitively coding is configured to append repeated bits to the encoded communication signal, the appended repeated bits to be ignored by an outside device.

32. The apparatus of claim 29, wherein the means for repetitively coding is configured to insert repeated bits between original bits of the encoded communication signal, to reduce an amount of buffering associated with repetition coding.

33. The apparatus of claim 29, wherein the means for repetitively coding is configured to use a fractional step to select which bits are to be repeated, the fractional step being associated with a step size between repeated bits, the step size being a fractional number which is cumulated until it crosses an integer boundary.

34. The apparatus of claim 29, wherein the communication signal comprises a header and a payload.

35. The apparatus of claim 34, wherein the means for repetitively coding is configured to repetitively code the header of the encoded communication signal.

36. The apparatus of claim 34, wherein the means for repetitively coding is configured to repetitively code the payload of the encoded communication signal.

37. The apparatus of claim 29, wherein the apparatus does not include an Reed Solomon (RS) coder immediately prior to the means for encoding.

38. The apparatus of claim 29, wherein an amount of repetition by the means for repetitively coding is signaled via the MAC message.

39. The apparatus of claim 29, wherein an amount of repetition by the means for repetitively coding is signaled in the one or more header bits.

40. The apparatus of claim 29, wherein the apparatus is a communication device having at least one transmit or receive antenna.

41. The apparatus of claim 29, further comprising:
a first branch for processing the communication signal, the first branch comprising the means for repetitively coding and the means for interleaving the repetitively coded communication signal;
a second branch for processing the communication signal, the second branch comprising:
means for puncturing the encoded communication signal;
means for interleaving the punctured communication signal; and
means for spreading the interleaved communication signal; and
means for selecting between the first branch and the second branch.

42. The apparatus of claim 29, wherein the means for interleaving is configured to use a high data rate mode to interleave the repetitively coded communication signal.

43. A processor for coding a communication signal, comprising:
an encoder configured to encode the communication signal and to increase a length of the communication signal;
a repetition coder configured to repetitively code part of the encoded communication signal and to generate a repetitively coded communication signal that includes at least a MAC message or one or more header bits to signal a type of repetitive coding implemented in a header by the repetition coder; and
an interleaver configured to interleave the repetitively coded communication signal.

44. The processor of claim 43, wherein the repetition coder is configured to append repeated bits to the encoded communication signal, the appended repeated bits to be used by an outside device.

45. The processor of claim 43, wherein the repetition coder is configured to append repeated bits to the encoded communication signal, the appended repeated bits to be ignored by an outside device.

46. The processor of claim 43, wherein the repetition coder is configured to insert repeated bits between original bits of the encoded communication signal, to reduce an amount of buffering associated with repetition coding.

47. The processor of claim 43, wherein the repetition coder is configured to use a fractional step to select which bits are to be repeated, the fractional step being associated with a step size between repeated bits, the step size being a fractional number which is cumulated until it crosses an integer boundary.

48. The processor of claim 43, wherein the communication signal comprises a header and a payload.

49. The processor of claim 48, wherein the repetition coder is configured to repetitively code the header of the encoded communication signal.

50. The processor of claim 48, wherein the repetition coder is configured to repetitively code the payload of the encoded communication signal.

51. The processor of claim 43, wherein the processor does not include an Reed Solomon (RS) coder immediately prior to the encoder.

52. The processor of claim 43, wherein an amount of repetition by the repetition coder is signaled via the MAC message.

53. The processor of claim 43, wherein an amount of repetition by the repetition coder is signaled in the one or more header bits.

54. The processor of claim 43, wherein the processor is included in a communication device having at least one transmit or receive antenna.

55. The processor of claim 43, further comprising:
a first branch for processing the communication signal, the first branch comprising the repetition coder and the interleaver;
a second branch for processing the communication signal, the second branch comprising:
a puncturer coupled to the encoder and configured to puncture the encoded communication signal;
a second interleaver configured to interleave the punctured communication signal; and
a spreader configured to spread the interleaved communication signal; and
a selector for selecting between the first branch and the second branch.

56. The processor of claim 43, wherein the interleaver is configured to use a high data rate mode to interleave the repetitively coded communication signal.

57. A non-transitory machine-readable medium encoded with instructions for coding a communication signal, the instructions comprising code for:
encoding the communication signal and increasing a length of the communication signal;
repetitively coding part of the encoded communication signal and generating a repetitively coded communication signal that includes at least a MAC message or one or more header bits to signal a type of repetitive coding implemented in a header; and
interleaving the repetitively coded communication signal.

58. The machine-readable medium of claim 57, wherein the code for repetitively coding comprises code for appending repeated bits to the encoded communication signal, the appended repeated bits to be used by an outside device.

59. The machine-readable medium of claim 57, wherein the code for repetitively coding comprises code for appending repeated bits to the encoded communication signal, the appended repeated bits to be ignored by an outside device.

60. The machine-readable medium of claim 57, wherein the code for repetitively coding comprises code for inserting repeated bits between original bits of the encoded communication signal, to reduce an amount of buffering associated with repetition coding.

61. The machine-readable medium of claim 57, wherein the code for repetitively coding comprises code for using a fractional step to select which bits are to be repeated, the fractional step being associated with a step size between repeated bits, the step size being a fractional number which is cumulated until it crosses an integer boundary.

62. The machine-readable medium of claim 57, wherein the communication signal comprises a header and a payload.

63. The machine-readable medium of claim 62, wherein the code for repetitively coding comprises code for repetitively coding the header of the encoded communication signal.

64. The machine-readable medium of claim 62, wherein the code for repetitively coding comprises code for repetitively coding the payload of the encoded communication signal.

65. The machine-readable medium of claim 57, wherein the code does not comprise code for performing Reed Solomon (RS) coding immediately prior to the encoding.

66. The machine-readable medium of claim 57, wherein an amount of repetition performed by the repetitively coding is signaled via the MAC message.

67. The machine-readable medium of claim 57, wherein an amount of repetition performed by the repetitively coding is signaled in the one or more header bits.

68. The machine-readable medium of claim 57, wherein the instructions are executable in a communication device having at least one transmit or receive antenna.

69. The machine-readable medium of claim 57, the instructions further comprising code for:
selecting one of a first branch and a second branch, wherein the first branch comprises the code for the repetitively coding and the interleaving, and the second branch comprises code for:
puncturing the encoded communication signal;
interleaving the punctured communication signal; and
spreading the interleaved communication signal.

70. The machine-readable medium of claim 57, wherein the interleaving uses a high data rate mode to interleave the repetitively coded communication signal.

71. A method for coding a communication signal, the method comprising:
convolutionally encoding the communication signal and increasing a length of the communication signal; and
repetitively coding part of the encoded communication signal utilizing at least some of the increased length of the communication signal, wherein the repetitively coding comprises:
appending repeated bits to the encoded communication signal such that the repeated bits are at least:
appended to the end of the communication signal; or
inserted between original bits and a MAC message or one or more header bits that signals a type of communication signal format implemented in a header is provided.

72. The method of claim 71, wherein the appended repeated bits are to be used by an outside device.

73. The method of claim 71, wherein the appended repeated bits are to be ignored by an outside device.

74. The method of claim 71, wherein inserting repeated bits between original bits of the encoded communication signal reduces an amount of buffering associated with repetition coding.

75. The method of claim 71, wherein the repetitively coding comprises using a fractional step to select which bits are to be repeated, the fractional step being associated with a step size between repeated bits, the step size being a fractional number which is cumulated until it crosses an integer boundary.

76. The method of claim 71, wherein the communication signal comprises a header and a payload.

77. The method of claim 76, wherein the repetitively coding comprises repetitively coding the header or the payload of the encoded communication signal.

78. The method of claim 71, wherein the method does not perform Reed Solomon (RS) coding immediately prior to the encoding.

79. The method of claim 71, wherein an amount of repetition performed by the repetitively coding is signaled via the MAC message.

80. The method of claim 71, wherein an amount of repetition performed by the repetitively coding is signaled in the one or more header bits.

81. The method of claim 71, wherein the method is performed by a mobile phone.

82. The method of claim 71, further comprising:
selecting one of a first branch and a second branch, wherein if the first branch is selected, the step of repetitively coding is performed, and wherein if the second branch is selected, the step of repetitively coding is replaced with the steps of:
puncturing the encoded communication signal;
interleaving the punctured communication signal; and
spreading the interleaved communication signal.

83. The method of claim 71, further comprising:
interleaving the repetitively coded communication signal, wherein the interleaving uses a high data rate mode to interleave the repetitively coded communication signal.

84. An apparatus for coding a communication signal, comprising:
means for convolutionally encoding the communication signal and increasing a length of the communication signal;
means for repetitively coding part of the encoded communication signal utilizing at least some of the increased length of the communication signal, wherein the means for repetitively coding is configured to append repeated bits to the encoded communication signal such that the repeated bits are at least:
appended to the end of the communication signal; or
inserted between original bits and the means for repetitively coding is further configured to provide a MAC message or one or more header bits that signals a type of communication signal format implemented in a header.

* * * * *